United States Patent
Parodi

(10) Patent No.: US 11,768,088 B2
(45) Date of Patent: *Sep. 26, 2023

(54) VOLTAGE-CURRENT PHASE-BASED METHOD FOR LINEAR AND ROTARY TRANSFORMER SYSTEMS, AND ASSOCIATED SYSTEMS AND METHODS

(71) Applicant: Blue Origin, LLC, Kent, WA (US)

(72) Inventor: Carlos G. Parodi, Issaquah, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,063

(22) Filed: Sep. 12, 2022

(65) Prior Publication Data

US 2023/0003555 A1   Jan. 5, 2023

Related U.S. Application Data

(63) Continuation of application No. 16/899,458, filed on Jun. 11, 2020, now Pat. No. 11,467,003.

(51) Int. Cl.
  *G01D 5/20* (2006.01)
  *H01F 21/00* (2006.01)
  (Continued)

(52) U.S. Cl.
  CPC .......... *G01D 5/2046* (2013.01); *H01F 21/065* (2013.01); *H01F 27/28* (2013.01)

(58) Field of Classification Search
  CPC .......... G01D 5/20; G01D 5/22; G01D 5/2216; G01D 5/2291; G01D 5/2046; H01F 21/065; H01F 27/28; G01B 7/00; G01B 7/14

See application file for complete search history.

(56) References Cited

U.S. PATENT DOCUMENTS 4,112,365 A * 9/1978 Larson ................ G01P 3/565
                                                 324/207.16
4,608,926 A    9/1986 Stevens
(Continued)

FOREIGN PATENT DOCUMENTS

CN         101136605       3/2008
CN         100542007       9/2009
(Continued)

OTHER PUBLICATIONS

Zhu et al., "Design Considerations of Fault-Tolerant Electromechanical Actuator Systems for More Electric Aircraft (MEA)," IEEE, 2008 7 pages.
(Continued)

*Primary Examiner* — Jermele M Hollington
*Assistant Examiner* — Suresh K Rajaputra
(74) *Attorney, Agent, or Firm* — Perkins Coie LLP

(57) ABSTRACT

A representative phase-shift based method for using a transformer system to detect movement of an object, and associated systems and methods are disclosed. A representative transformer system detects movement of an object and includes an excitation coil configured to receive an excitation coil input signal that results from an input sinusoidal signal. The transformer further includes first and second sensing coils, and a core configured to be operatively coupled to the object. The core moves relative to the first and second sensing coils when the object moves. First and second impedance loads are connected to the first and second sensing coils, respectively. The two impedance loads have different phase-shifting characteristics. A phase-shift sensing circuit determines a phase-shift between the excitation coil input signal and the input sinusoidal signal that is correlated with a position of the core relative to the first and second sensing coils.

20 Claims, 14 Drawing Sheets

(51) Int. Cl.
*H01F 27/28* (2006.01)
*H01F 21/06* (2006.01)

(56) References Cited

U.S. PATENT DOCUMENTS

| | | | |
|---|---|---|---|
| 5,372,071 A | 12/1994 | Richards | |
| 5,898,123 A | 4/1999 | Fritz et al. | |
| 7,659,686 B2 | 2/2010 | Osada et al. | |
| 7,710,081 B2 | 5/2010 | Saban et al. | |
| 7,957,942 B2 | 6/2011 | Ivchenko et al. | |
| 8,695,473 B2 | 4/2014 | Kametz | |
| 8,727,654 B2 | 5/2014 | Graham | |
| 9,484,852 B2 | 11/2016 | Timmons et al. | |
| 10,205,416 B2 | 2/2019 | Furukawa | |
| 10,328,970 B2 | 6/2019 | Keum | |
| 11,467,003 B1 * | 10/2022 | Parodi | H01F 21/065 |
| 2003/0102862 A1 * | 6/2003 | Goto | G01D 5/202 |
| | | | 324/207.16 |
| 2006/0250042 A1 | 11/2006 | Neet | |
| 2017/0047728 A1 | 2/2017 | Benarous et al. | |
| 2018/0056793 A1 | 3/2018 | Rozman et al. | |
| 2022/0255482 A1 | 8/2022 | Jevremovic | |
| 2022/0388695 A1 | 12/2022 | Patty | |

FOREIGN PATENT DOCUMENTS

| | | |
|---|---|---|
| CN | 102132483 | 7/2011 |
| CN | 103580584 | 2/2014 |
| CN | 104160612 | 11/2014 |
| CN | 105763116 | 5/2019 |
| EP | 3131198 | 2/2017 |
| EP | 2412091 | 8/2018 |
| WO | WO-2016003807 | 1/2016 |

OTHER PUBLICATIONS

Recalde, Raul Igmar Gregor, "The Asymmetrical Dual Three-Phase Induction Machine and the MBPC in the Speed Control," InTech Open Science, Open Minds, Chapter 16, 2012, 16 pages.

Demir et al., "A Novel Dual Three-Phase Permanent Magnet Sychronous Motor with Asymmetric Stator Winding," IEEE Transactions on Magnetics, vol. 52, No. 7, Jul. 2016, 5 pages.

Giangrande et al., "Design of Fault-Tolerant Dual Three-Phase Winding PMSM for Helicopter Landing Gear EMA," https://www.researchgate.net/publication/328848285, Nov. 2018, 6 pages.

* cited by examiner

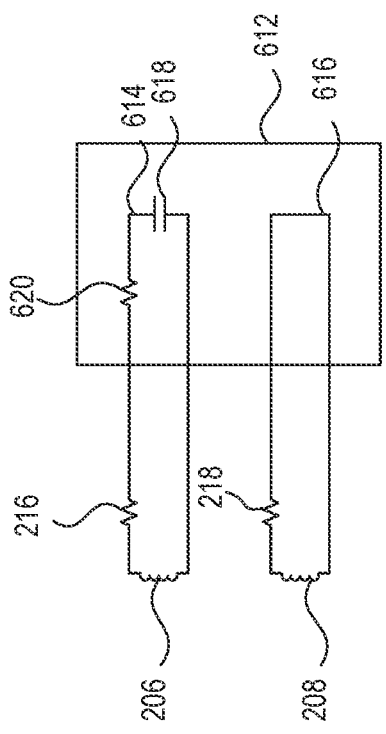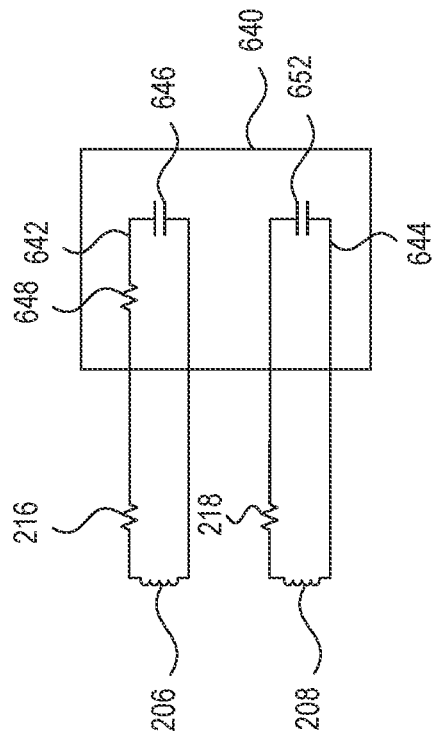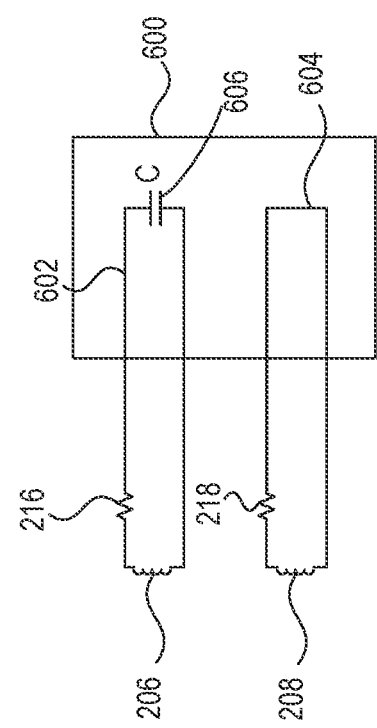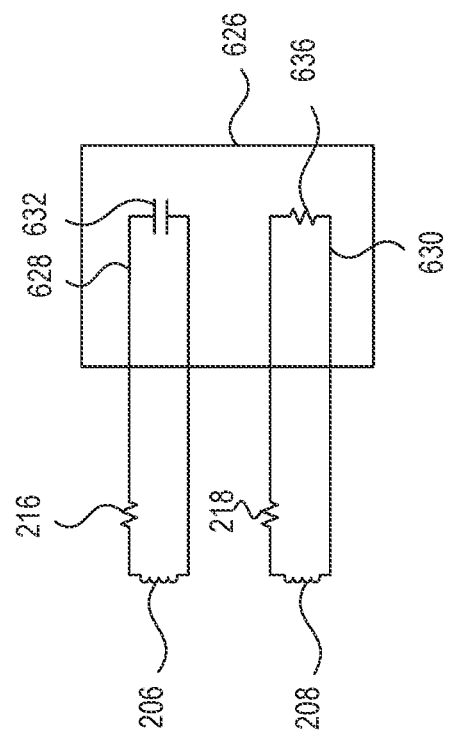
FIG. 6A
FIG. 6B
FIG. 6C
FIG. 6D

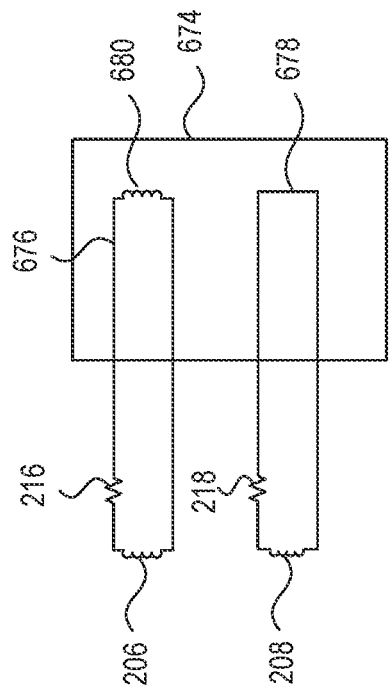
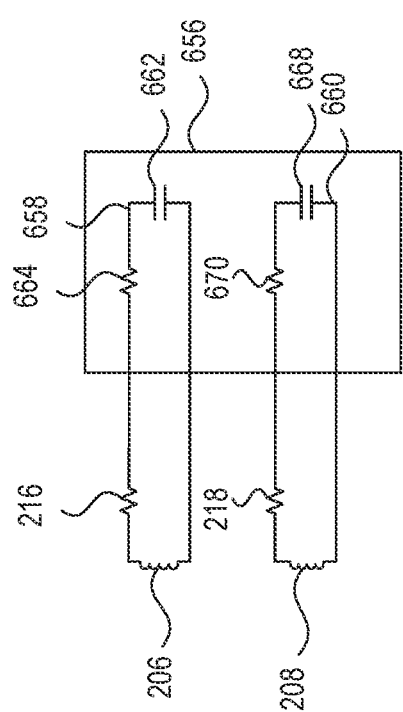

VOLTAGE-CURRENT PHASE-BASED METHOD FOR LINEAR AND ROTARY TRANSFORMER SYSTEMS, AND ASSOCIATED SYSTEMS AND METHODS

TECHNICAL FIELD

The present disclosure is directed generally to linear and/or rotary transformer systems that measure the position and/or angle of moving objects, and associated systems and methods.

BACKGROUND

Linear variable differential transformers (LVDTs) and rotary variable differential transformers (RVDTs) are used in a large variety of systems to measure a position or an angle, respectively, of another device. A ferrous core is attached to the moving device and as the device moves, the core moves relative to an excitation coil and two sensing coils. An excitation signal is generated on one or both of the sensing coils depending upon the position of the core. When the core is aligned between the excitation coil and the first sensing coil, the excitation signal shows up on the first sensing coil and not the second sensing coil. When the core is aligned between the excitation coil and the second sensing coil, the excitation signal shows up on the second sensing coil and not the first. For intermediate positions of the core, the excitation signal shows up proportionately on the first and second sensing coils, such that the ratio of the signals detected on the two sensing coils correspond to the position of the core. Therefore, the signals on the sensing coils are measured to determine the position of the core, and thus the position of the object.

A disadvantage of using the LVDT/RVDT is that all three coils need to be connected, which requires the use of six cables. Depending upon where the LVDT/RVDT is installed in the system, the system may require long and/or large wire bundles that can experience significant levels of noise. Another disadvantage is that relative errors in the measurements of the two sensing coils (e.g., due to differences in precision of the two measuring circuits and/or averaging circuits) can lead to result inaccuracies. Also, since root mean square (RMS) values are typically used for voltage measurements, additional delay is incurred in the measurement process due to the filtering process of the RMS values. Aspects of the present disclosure are directed to addressing at least these disadvantages.

BRIEF DESCRIPTION OF THE DRAWINGS

FIGS. 6A-6F illustrate different pseudo-loads that include first and second impedance loads that have different phase-shifting characteristics in accordance with embodiments of the present technology.

DETAILED DESCRIPTION

Embodiments of the technology disclosed herein are directed generally to tracking the movement of objects such as fins and nozzles within a rocket system, and associated systems and methods. In particular, an LVDT and/or RVDT can include interconnected pseudo-loads that can cause phase-shifts in signals that are representative of the movement of the object. The phase-shift can be detected remotely from the LVDT/RVDT and the object being tracked. Fewer cables are needed to operate the LVDT/RVDT with the pseudo-loads, resulting to lower weight and space requirements in the rocket system.

Figure 1:
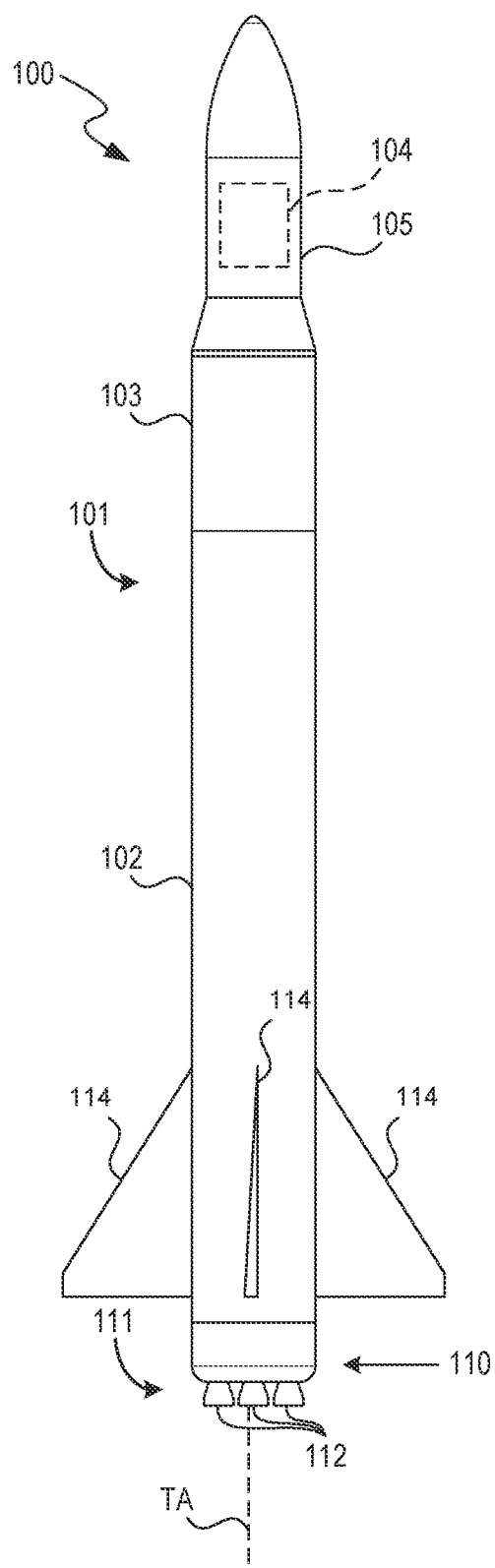
FIG. 1 is a partially schematic illustration of a representative rocket system configured in accordance with embodiments of the present technology.

FIG. 1 is a partially schematic illustration of a representative rocket system 100 configured in accordance with embodiments of the present technology. The system 100 can include a vehicle 101 (e.g., a launch vehicle) having a single or a multi-stage configuration. In the representative embodiment shown in FIG. 1, the vehicle 101 includes a first stage 102, a second stage 103, and a payload 104 (shown schematically in FIG. 1) surrounded by a fairing 105. The first stage 102 and the second stage 103 operate as boosters to direct the payload 104 into space. The first stage 102 can include one or more fins 114 that can be angularly adjusted to provide stability, control, and/or direction to the vehicle 101 during flight. In other embodiments, the vehicle 101 can include a single booster, or more than two boosters. In any of these embodiments, at least one of the boosters (e.g., the first stage 102) is configured to be returned to Earth in a tail-down configuration, and is then reused on a subsequent launch.

The first stage 102 can include a propulsion system 110 that can in turn include one or more main engines 111 (positioned within the first stage 102). Each main engine 111 can include a corresponding nozzle 112. During launch, the main engines 111 provide the primary force directing the vehicle 101 upwardly. During a tail-down reentry, the thrust provided by the main engines 111 provides a braking force on the first stage 102 as it descends and lands in preparation for its next mission. In both cases, thrust is provided along a thrust axis TA, which can be adjusted to steer or maneuver the vehicle 101. In some embodiments, an orientation of one or more of the nozzles 112 can be adjusted to steer, maneuver, and/or control the vehicle 101.

Rocket systems 100 of the type shown in FIG. 1 include numerous actuators to control elements of the propulsion system and flight control system, among others. Sensors, including LVDTs and/or RVDTs, are often used to detect the motion of movable system components, e.g., to confirm that the actual motion matches the commanded motion. Standard LVDTs and/or RVDTs require six cables, which can result in large wire bundles that can run for a significant distance from the LVDT/RVDT to the control circuitry that commands and controls the movable object. This increases space requirements, cost, and potentially, time to troubleshoot a problem. Also, the standard LVDT/RVDT determines the position of an object by calculating an RMS value, resulting in a time delay. This can be a disadvantage in critical systems that rely on precise measurements and positioning within a very small time window.

As discussed further below, adjustments to the nozzles 112, fins 114, and/or other linearly and/or rotationally movable objects within the rocket system 100 can be controlled, facilitated and/or oriented by one or more linear transformer system and/or rotary transformer system. The linear and/or rotary transformers systems can be used in many other applications, including those that require long wire bundles, experience extreme heat and/or pressure conditions, and/or conditions that produce high levels of vibration. Other applications include those that may have limited space for cabling, as well as systems that can benefit from a faster determination of the position of the movable object.

Figure 2:
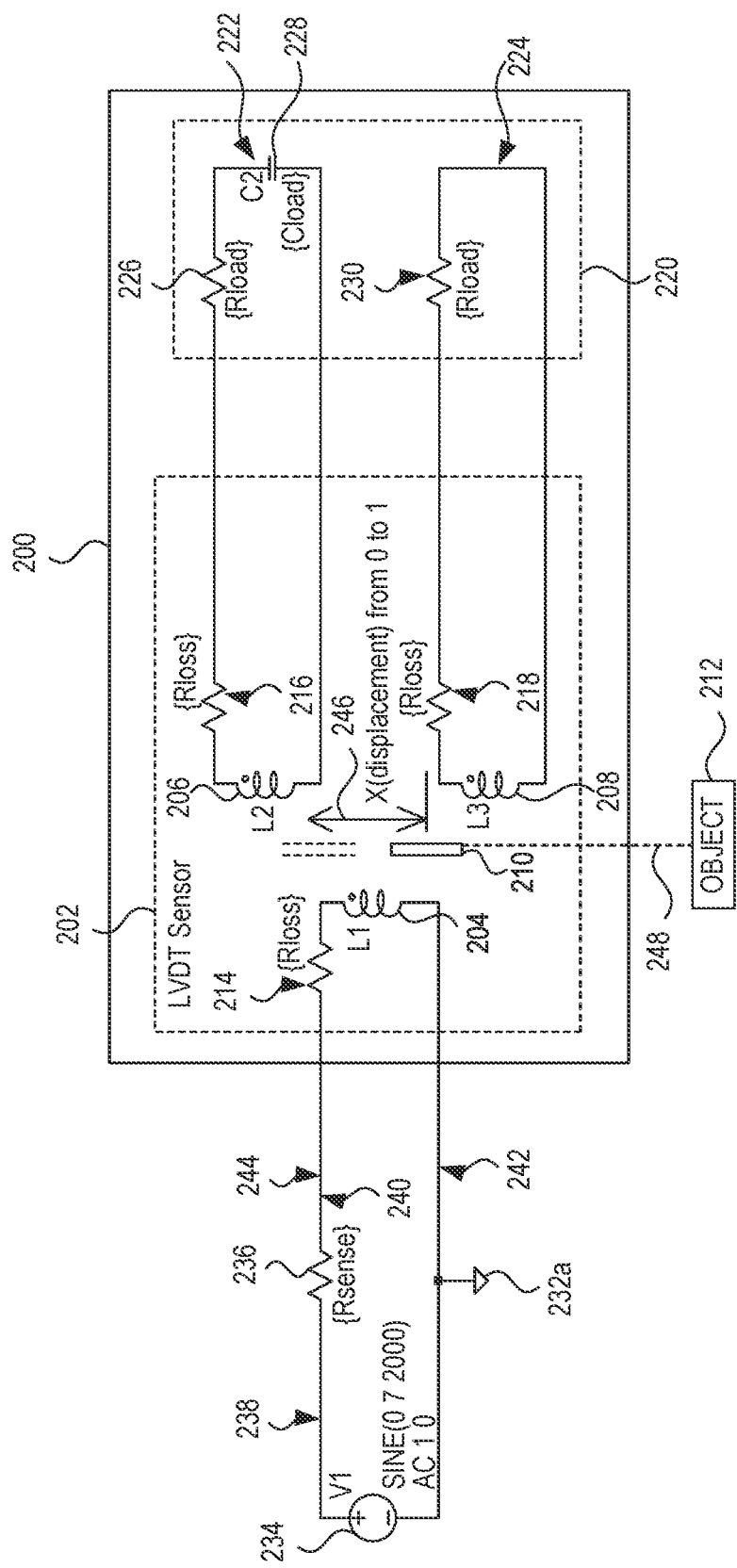
FIG. 2 is a schematic diagram of a linear transformer system used to detect linear movement of an object in accordance with embodiments of the present technology.

FIG. 2 is a schematic diagram of a linear transformer system 200 used to detect linear movement of an object 212 in accordance with embodiments of the present technology. For objects that move rotationally, a rotary transformer system 300, as discussed below and shown in FIG. 3, can be used.

The linear transformer system 200 includes an LVDT 202 having an excitation coil 204 and first and second sensing coils 206, 208. In some embodiments, each of the excitation coil 204 and the first and second sensing coils 206, 208 can have a 16 mH inductance and a series resistance of 2 ohms. A core 210 is configured to be operatively coupled (e.g., coupleable) to the object 212 through a linkage 248. The linkage 248 is illustrated as a dotted line on FIG. 2, and the implementation can vary based on the object 212. For example, the object 212 can be one of the fins 114 and/or nozzles 112 (FIG. 1).

Components within the linear transformer system 200 and connected thereto are subject to losses due to resistance. A resistive loss 214 represents the resistive loss value associated with a first cable 240 connected to the excitation coil 204, and the internal resistance of the excitation coil 204 itself. Additional resistive losses 216, 218 represent resistive loss values associated with the indicated cables and/or wires shown in FIG. 2 as well as the internal resistance of the first and second sensing coils 206, 208, respectively.

Pseudo-loads 220 are connected to the LVDT 202. The term "pseudo-load" is used herein to refer to an impedance load with known resistance and/or capacitance values that is connected in a closed circuit with one or both of the first and second sensing coils 206, 208. Pseudo-loads 220 can include a first impedance load 222 connected to the first sensing coil 206 and a second impedance load 224 connected to the second sensing coil 208. The first impedance load 222 has a first resistive element 226 and a first capacitive element 228 in series with the first sensing coil 206. The second impedance load 224 has a second resistive element 230 in series with the second sensing coil 208. One or both of the resistive elements 226, 230 can be optional in some embodiments.

The pseudo-loads 220 can be co-located with (e.g., located nearby, adjacent to, within a common housing, and/or in very close proximity to) the LVDT 202. In some embodiments, the linear transformer system 200 has a single housing that holds the pseudo-loads 220 and the LVDT 202 there within. In other embodiments, the first and second impedance loads 222 and 224 are physically separate from each other and the LVDT 202. In yet further embodiments, the first and second impedance loads 222, 224 of the pseudo-loads 220 are positioned within a first housing that is located near, and interconnected with, the LVDT 202, which is located within a second housing. In other embodiments, the foregoing components can have other configurations and thus are not restricted by these examples.

In a representative embodiment, a sensing resistor 236 is connected to a sinusoidal waveform generation circuit 234 proximate a first terminal of the sensing resistor 236 and to the excitation coil 204 proximate a second terminal of the sensing resistor 236. The sinusoidal waveform generation circuit 234 provides an input sinusoidal signal 238 that passes along a segment of the first cable 240 between the sinusoidal waveform generation circuit 234 and through the sensing resistor 236. In some embodiments, a 2 KHz sinusoidal signal with a 500 μs period at a constant amplitude can be used. Therefore, the input sinusoidal signal 238 has a constant amplitude and constant frequency. The signal delivered along a segment of the first cable 240 between the sensing resistor 236 and the excitation coil 204 is referred to herein as excitation coil input signal 244. A second cable 242 returns from the excitation coil 204 to the sinusoidal waveform generation circuit 234 and is tied to common ground 232a.

Each of the first and second impedance loads 222, 224 has a different impedance angle in the real/imaginary plane. Each of the impedance angles has a corresponding angle difference in the voltage and current waveforms. Therefore, some impedance angles result in a phase-shift difference between the voltage and current waveforms as discussed below.

When the object 212 moves linearly, it moves the core 210 along a path indicated by arrow 246. In general, when the position of the core 210 couples the excitation coil 204 with the second sensing coil 208, which has a resistive load (e.g., the second impedance load 224 with the resistive element 230), the excitation signal sees a mostly resistive load. In this position, the current and voltage are approximately in phase when measured at the excitation coil 204. The phase-shift difference in this example corresponds to the impedance angle of the second impedance load 224. When the position of the core 210 couples the excitation coil 204 with the first sensing coil 206, which has a predominantly capacitive load (e.g., the first impedance load 222 with the capacitive element 228), the excitation signal sees a mostly capacitive load, which causes a phase difference of approximately 90 degrees between the voltage and current on the excitation coil 204. The phase-shift difference in this example corresponds to the impedance angle of the first impedance load 222.

When the position of the core 210 is in between the first and second impedance loads 222, 224, the phases of the voltage and current in the excitation coil 204 are correspondingly shifted (e.g. between zero and 90 degrees). In other words, the phase-shift difference corresponds to the impedance angle of the load seen by and/or coupled to the excitation of the excitation coil 204.

The voltage-current phase difference (e.g., the phase-shift or phase difference between the voltage and current), can also be detected on the excitation coil input signal 244 along the segment of the first cable 240 between the sensing resistor 236 and the excitation coil 204. However, the input sinusoidal signal 238 detected between the sensing resistor 236 and the sinusoidal waveform generation circuit 234 does not experience this voltage-current phase difference, allowing a measurable phase-shift between the two signals 238 and 244.

Figure 3:
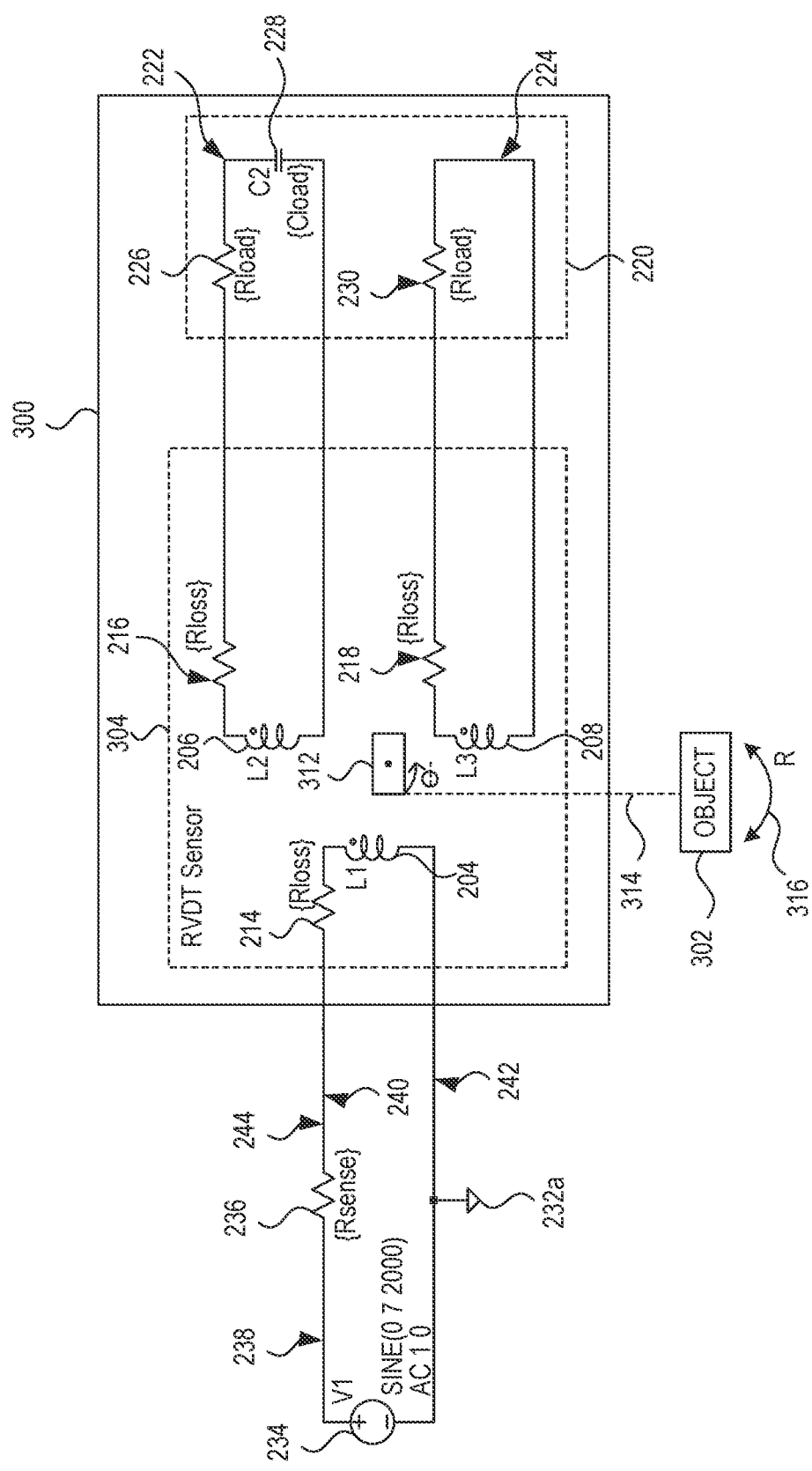
FIG. 3 is a schematic diagram of a rotary transformer system used to detect rotational movement of an object in accordance with embodiments of the present technology.

FIG. 3 is a schematic diagram of a rotary transformer system 300 used to detect rotational movement of an object 302 in accordance with embodiments of the present technology. In some embodiments, some of the components within the rotary transformer system 300 can be the same as components within the linear transformer system 200 of FIG. 2, and thus like item numbers are used.

A core 312 is configured to be operatively coupled to the object 302 through a linkage 314. The linkage 314 is illustrated as a dotted line in FIG. 3, and the implementation can vary based on the object 302 that is rotationally moving. In some embodiments, the object 302 is one of the fins 114 and/or nozzles 112 (FIG. 1).

The RVDT 304 is interconnected with the pseudo-loads 220, and each of the first and second impedance loads 222, 224 has a different impedance angle. Therefore, each of the first and second impedance loads 222, 224 has a different phase-shifting characteristic. The variations with respect to co-location and the housing of circuits and various components as discussed with respect to the linear transformer system 200 also apply to the rotary transformer system 300.

When the object 302 moves angularly (indicated by arrow 316), it moves the core 312 relative to the excitation coil 204 and the first and second sensing coils 206, 208. The position of the core 312 couples the excitation signal to one or both of the first and second sensing coils 206, 208, resulting in a voltage-current phase difference on the excitation coil input signal 244 along the segment of the first cable 240 between the sensing resistor 236 and the excitation coil 204.

Figure 4:
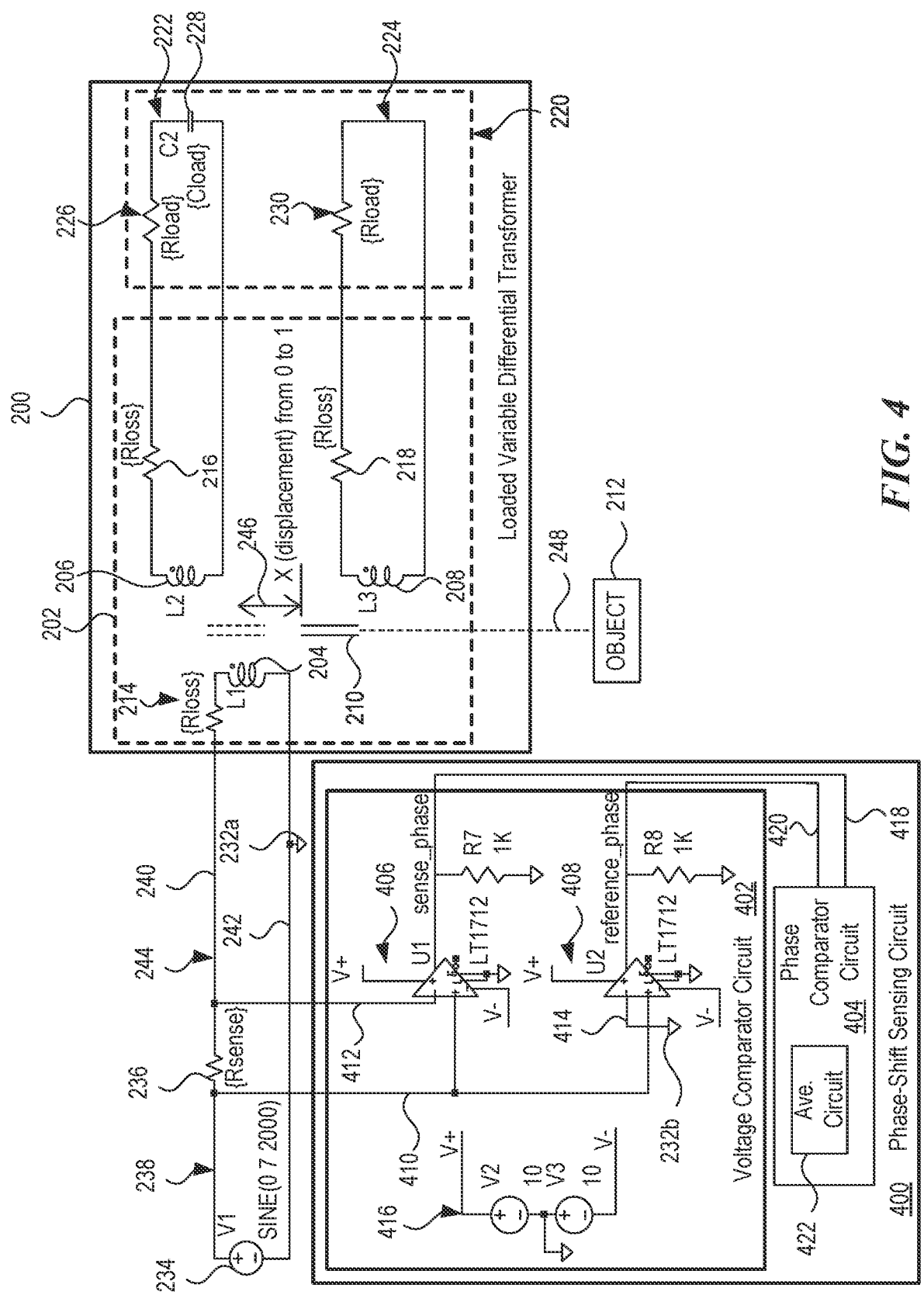
FIG. 4 illustrates a linear transformer system interconnected with circuits configured to determine the position of the core of the transformer, which correlates to the position of an object connected to the core, in accordance with embodiments of the present technology.

FIG. 4 illustrates the linear transformer system 200 interconnected with circuits configured to determine the position of the core 210, which correlates to the position of the object 212, in accordance with embodiments of the present technology. The first and second impedance loads 222, 224 have different phase-shifting characteristics. As discussed above with reference to FIG. 2, the first impedance load 222 has a greater capacitive component than does the second impedance load 224, and the second impedance load 224 has a greater resistive component than does the first impedance load 222.

A phase-shift sensing circuit 400 can be connected to the first cable 240 and can include a voltage comparator circuit 402 and a phase comparator circuit 404. The voltage comparator circuit 402 includes first and second comparators 406, 408. First and second input signals 410, 412 to the first comparator 406 correlate to the input sinusoidal signal 238 and the excitation coil input signal 244, respectively. The first input signal 410 (e.g., the input sinusoidal signal 238) is also input to the second comparator 408, while a second input 414 of the second comparator 408 is tied to common ground 232b. Voltage source 416 provides appropriate voltages levels to the first and second comparators 406, 408.

The first and second input signals 410, 412 are detected on either side of the sensing resistor 236. The first comparator 406 compares the signal voltage of the input sinusoidal signal 238 on the first input signal 410 to the signal voltage of the excitation coil input signal 244 on the second input signal 412 and outputs a first digital signal 418. In some embodiments, the first comparator 406 measures the voltage drop across the sensing resistor 236, which provides a measurement of the current waveform, as the voltage and current are in phase across the sensing resistor 236. In a representative embodiment, the first digital signal 418 is a square wave that represents a digital transformation of the excitation coil input signal 244. The second comparator 408 compares the signal voltage of the input sinusoidal signal 238 on the first input signal 410 to the common ground 232b on the second input 414 and outputs a second digital signal 420. In a representative embodiment, the second digital signal 420 is a square wave that represents a digital transformation of the input sinusoidal signal 238.

In general, the outputs of the first and second comparators 406, 408 can be compared to determine the position of the core 210. The first and second digital signals 418, 420 are then compared by the phase comparator circuit 404 to determine if there is a phase-shift (e.g., a timing difference) between the input sinusoidal signal 238 and the excitation coil input signal 244. In some embodiments, the phase comparator circuit 404 determines if there is a phase-shift by identifying and comparing rising and/or trailing edges of the first and second digital signals 418, 420. This can be achieved in many embodiments by using standard digital circuits (not shown), such as one or more microcontroller units (MCUs) and/or digital logic circuits. Determining the timing difference can be accomplished with no delay, because in several embodiments, an averaging circuit is not required. In other embodiments, an averaging circuit 422 can be used. In either case, the timing difference can be correlated with a position of the movable object 212.

In some embodiments, the sinusoidal waveform generation circuit 234, the sensing resistor 236 and the phase-shift sensing circuit 400 are not co-located with the linear transformer system 200, 300 (FIG. 3), but are located a distance away. In contrast to using a standard LVDT and/or RVDT that requires six cables to extend from the LVDT/RVDT to the measuring and control circuits, one of the advantages of using the transformer system 200, 300 is that only the first and second cables 240, 242 are needed. For example, the transformer system 200, 300 can be connected to one of the nozzles 112 (FIG. 1) in the propulsion system 110, or one of the fins 114 in the first stage 102 of the system 100 (e.g., near where a moving part is located and a measurement needs to be taken), while the sinusoidal waveform generation circuit 234, the sensing resistor 236 and the phase-shift sensing circuit 400 are located a distance away (e.g., inside avionics systems, such as embedded controllers, engine controllers and/or other avionics) and connected via two cables and/or wires. Other control circuits (not shown) can be used to adjust and/or control the position of the moving object 212 based on the detected phase-shift.

In other embodiments, the sensing resistor 236 can be replaced with one or more elements that have capacitive, inductive and/or resistive characteristics, and/or a combination of some or all of these elements. However, if a component other than a resistive element is used, a phase-shift between the voltage and current can occur on the excitation coil input signal 244 when a purely resistive pseudo-load is connected to the LVDT 202. This phase-shift can introduce additional calculations that need to be accomplished to determine the movement of the object 212.

Figure 5:
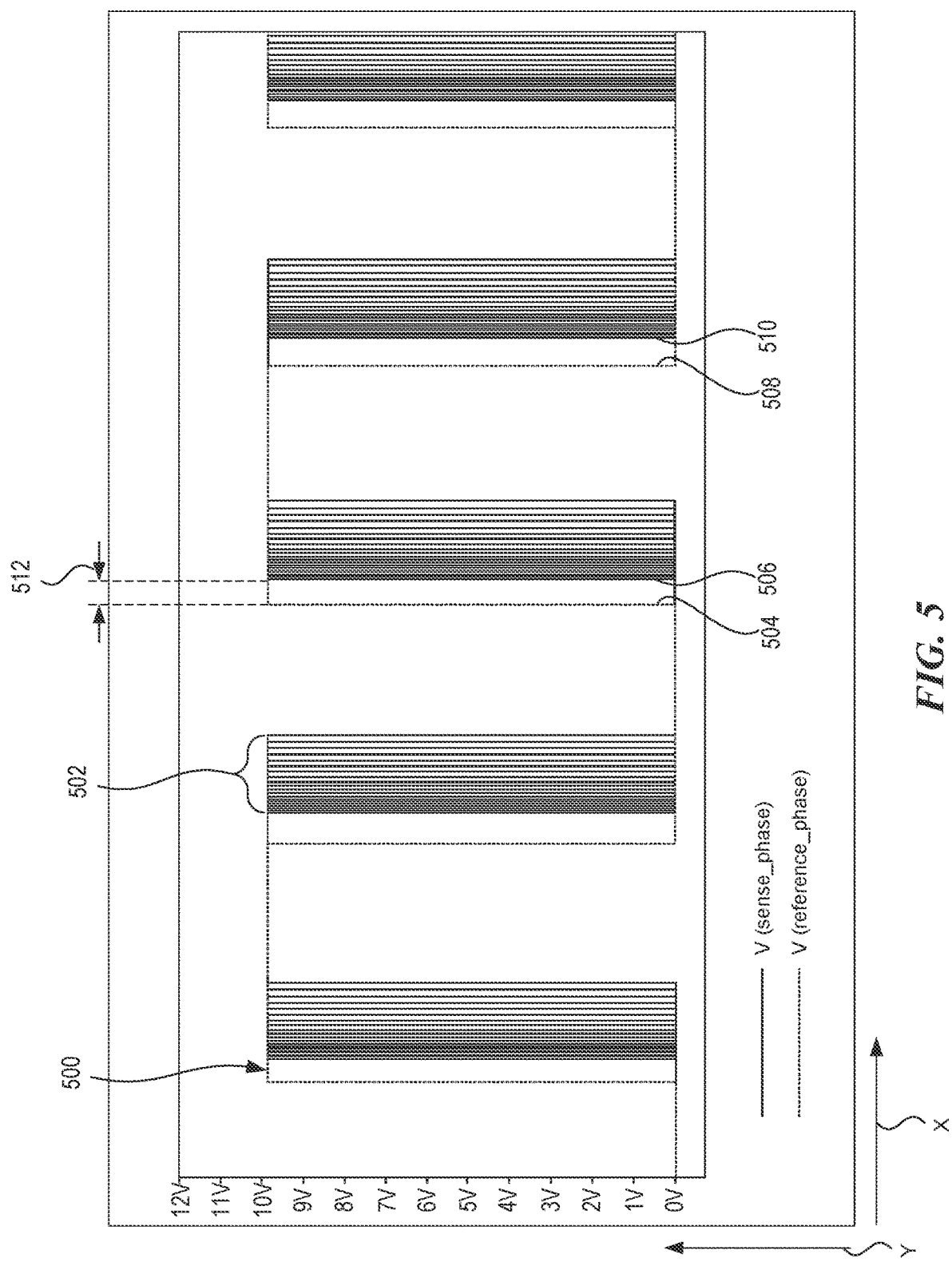
FIG. 5 illustrates example digital waveforms corresponding to the first and second digital signals used to determine the position of the object connected to the core of the linear transformer system in accordance with embodiments of the present technology.

FIG. 5 illustrates example digital waveforms corresponding to the first and second digital signals 418 and 420 (FIG. 4) in accordance with embodiments of the present technology. These digital waveforms can be generated by either of the transformer systems 200, 300 (FIGS. 2 and 3) when used together with the sinusoidal waveform generation circuit 234, the sensing resistor 236 and phase-shift sensing circuit 400 (FIG. 4).

Voltage level is represented on the Y-axis and time is represented on the X-axis. Reference phase waveform 500 corresponds to the second digital signal 420 output from the second comparator 408 (FIG. 4). In other words, the reference phase waveform 500 is a square wave that represents a digital transformation of the input sinusoidal signal 238. Rising edge 504 of the reference phase waveform 500 represents the time at which the voltage waveform of the input sinusoidal signal 238 crosses from negative to positive. Trailing edge 508 of the reference phase waveform 500 represents the time at which the voltage waveform of the input sinusoidal signal 238 crosses from positive to negative. The voltage and current are in phase prior to, and across, the sensing resistor 236.

A plurality of sense phase waveforms 502 are also shown in FIG. 5. The sense phase waveforms 502 correspond to the first digital signal 418 output from the first comparator 406 as the core 210 moves over its range, coupling to the second impedance load 224 (which is all or mostly resistive) and then to the first impedance load 222 (which is mostly capacitive, see FIG. 4). The sense phase waveforms 502 can, in some embodiments, experience noise when transitioning between high and low, depending on the position of the core 210 with respect to the first and second sensing coils 206, 208 (FIG. 4). If excessive noise is experienced, the averaging circuit 422 (FIG. 4) can be used to average the signals over a predetermined time interval.

The rising edge 506 of the first sense phase waveform 502 represents the point in time at which the voltage level of the input sinusoidal signal 238 (e.g., first input signal 410) exceeds the voltage level of the excitation coil input signal 244 (e.g., second input signal 412), and the output of the first comparator 406 goes high. The trailing edge 510 of the first sense phase waveform 502 represents the point in time at which the voltage level of the input sinusoidal signal 238 drops below the voltage level of the excitation coil input signal 244, and the output of the first comparator 406 goes low.

As the core 210 (FIG. 4) moves between the two impedance loads 222, 224, the changing capacitance level of the coupled load has a direct effect on the phase of the current that is on the excitation coil 204. When the core 210 is coupled with an impedance load that is mostly resistive (e.g., the second impedance load 224), the rising edge 506 of the sense phase waveform 502 is delayed by a timing difference 512 compared to the rising edge 504 of the reference phase waveform 500 that represents a voltage drop across sensing resistor 236. In some embodiments the timing difference 512 can be present even when the impedance load is purely resistive. As the core 210 moves and couples to an increasingly capacitive impedance load, the timing difference 512 between the rising edge 506 of the sense phase waveform 502 and the rising edge 504 of the reference phase waveform 500 increases.

FIGS. 6A-6F are schematic illustrations of pseudo-loads suitable for use with the transformer systems 200, 300 (FIGS. 2, 3) in accordance with further embodiments of the present technology. Although various configurations are shown, the first and second impedance loads within the pseudo-loads can include more or fewer resistive elements (e.g., resistors), capacitive elements (e.g., capacitors), and/or inductive elements (e.g., inductive coils), as long as the phase-shifting characteristics of the first and second impedance loads are different from each other and result in a measurable phase-shift that can be indicated by the timing difference 512 (FIG. 5).

FIG. 6A shows a pseudo-load 600 that includes first and second impedance loads 602, 604 configured in accordance with embodiments of the present technology. The first impedance load 602 includes a capacitive element 606. The second impedance load 604 does not include an additional resistive or capacitive element. Therefore, the first impedance load 602 is more capacitive than the second impedance load 604, and the first and second impedance loads 602, 604 have different phase-shifting characteristics (e.g., different impedance angles).

In some embodiments, and as shown in FIG. 6A, the pseudo-load 600 is connected to the first and second sensing coils 206, 208 (FIG. 4) of the LVDT 202. As discussed previously, the resistive loss 216, 218 represents the resistance in the associated first and second sensing coils 206, 208 and can also include the resistance of the wiring and/or other connections between the first and second sensing coils 206, 208 and the connected impedance load 602, 604.

FIG. 6B shows a pseudo-load 612 that includes first and second impedance loads 614, 616 configured in accordance with further embodiments of the present technology. The first impedance load 614 includes a capacitive element 618 and a resistive element 620. The second impedance load 616 does not include an additional resistive or capacitive element. Therefore, the first impedance load 614 is more capacitive than the second impedance load 616, and the first and second impedance loads 614, 616 have different phase-shifting characteristics.

FIG. 6C shows a pseudo-load 626 that includes first and second impedance loads 628, 630 configured in accordance with still further embodiments of the present technology. The first impedance load 628 includes a capacitive element 632, and the second impedance load 630 includes a resistive element 636. As with embodiments shown in FIGS. 6A and 6B, the first impedance load 628 is more capacitive than the second impedance load 630, and thus the first and second impedance loads 628, 630 have different phase-shifting characteristics.

FIG. 6D shows a pseudo-load 640 that includes first and second impedance loads 642, 644 configured in accordance with yet further embodiments of the present technology. The first impedance load 642 includes a capacitive element 646 and a resistive element 648. The second impedance load 644 includes a capacitive element 652. The capacitive values of the first and second impedance loads 642, 644 are different to result in different phase-shifting characteristics. For example, in some embodiments, the capacitive element 646 can have a value of 10 µF and the capacitive element 652 can have a value of 100 µF, while the resistive element 648 can have a value of 33Ω.

FIG. 6E shows a pseudo-load 656 having a first impedance load 658 that includes a first capacitive element 662 and a first resistive element 664, and a second impedance load 660 that includes a second capacitive element 668 and a second resistive element 670 configured in accordance with embodiments of the present technology. As with the embodiment shown in FIG. 6D, the capacitive values are different and thus have different phase-shifting characteristics. For example, in some embodiments, the capacitive element 662 can have a value of 10 μF and the capacitive element 668 can have a value of 100 μF, while the resistive elements 664, 670 can both be 33Ω.

FIG. 6F shows a pseudo-load 674 that includes first and second impedance loads 676, 678 configured in accordance with embodiments of the present technology. The first impedance load 676 includes an inductive element 680, while the second impedance load 678 has the resistive loss 218 of the wiring. The first and second impedance loads 676, 678 have different phase-shifting characteristics (i.e. different impedance angles). In still further embodiments, one or more resistive elements and/or capacitive elements can be included in the first and second impedance loads 676, 678.

Figure 7:
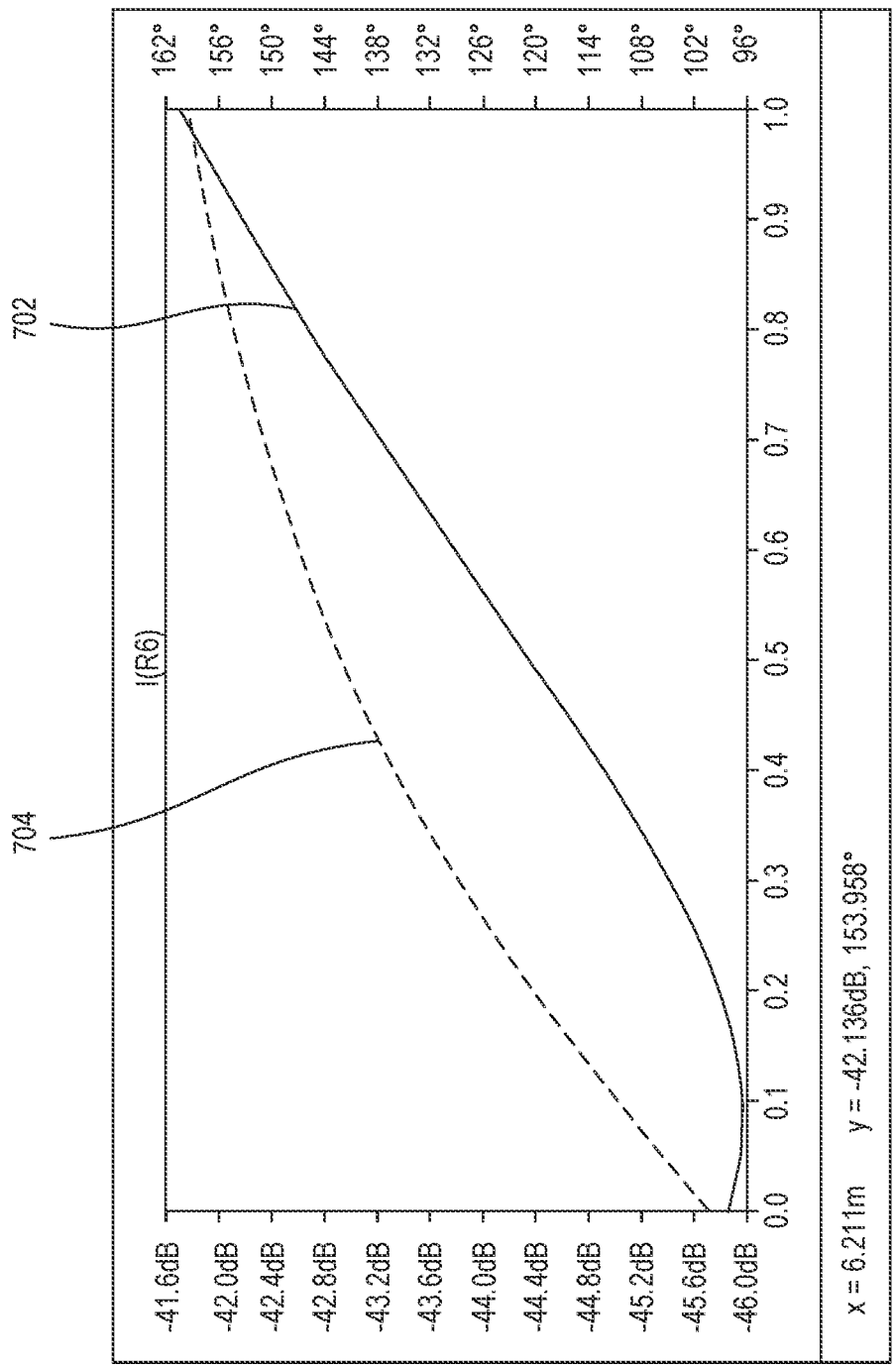
FIG. 7 illustrates a voltage-current relationship that is measured across the sensing resistor of FIG. 4 as the core moves along its range of motion between the first and second sensing coils in accordance with embodiments of the present technology.

FIG. 7 illustrates a voltage-current relationship 702 measured across the sensing resistor 236 (FIG. 4) as the core 210 moves along its range of motion relative to the first and second sensing coils 206, 208, in accordance with embodiments of the present technology. The phase angle 704 is also shown. In some embodiments, the relationship between the displacement of the core 210 (e.g., shown along the X-axis) and the voltage-current relationship 702 is monotonic, and varies between about 100 degrees to about 160 degrees. This allows approximately 60 degrees of phase difference to measure the displacement of the core 210 from 0 to 100%. The phase change, however, may not be linear with displacement.

Figure 8:
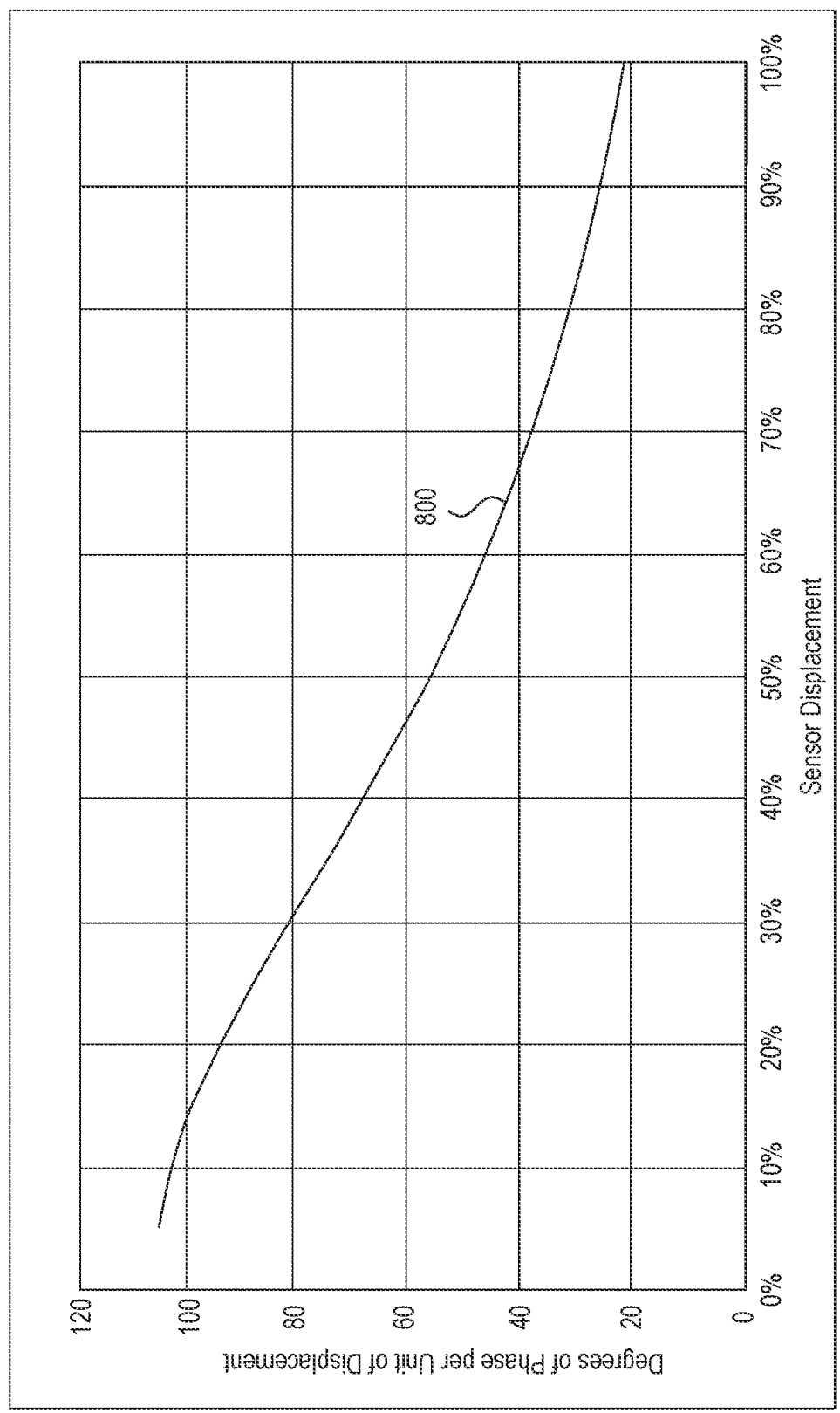
FIG. 8 is a graph of phase change vs. displacement of the circuit of FIG. 4 in accordance with embodiments of the present technology.

FIG. 8 shows that the sensitivity of the circuit (FIG. 4), measured as phase change vs. displacement (line 800), is more sensitive on one end of the displacement range than the other, in accordance with embodiments of the present technology. In some embodiments, using a 2 KHz sinusoidal excitation (500 μs period), the phase differences as measured on either side of the sensing resistor 236 (FIG. 4) yields a sensitivity per 1% displacement between 1.45 μs (e.g., best case and/or most sensitive) to 0.31 μs (e.g., worst case and/or least sensitive). Therefore, to measure a position with 1% resolution, a time resolution of 0.31 μs or better may be needed. This can easily be achieved in many embodiments using standard digital circuits (e.g., an MCU and/or digital logic circuit).

One advantage of embodiments of the present technology is that time-based and phase-based measurements (instead of voltage measurements that are sampled at the first and second sensing coils 206, 208) can produce greater immunity to component parameter variations. FIGS. 9-13 show simulations of the sensitivity of the phase-shift measurement technique to variations of several key component values. The discussion below applies to systems described above, including those shown in FIGS. 2-4.

Figure 9:
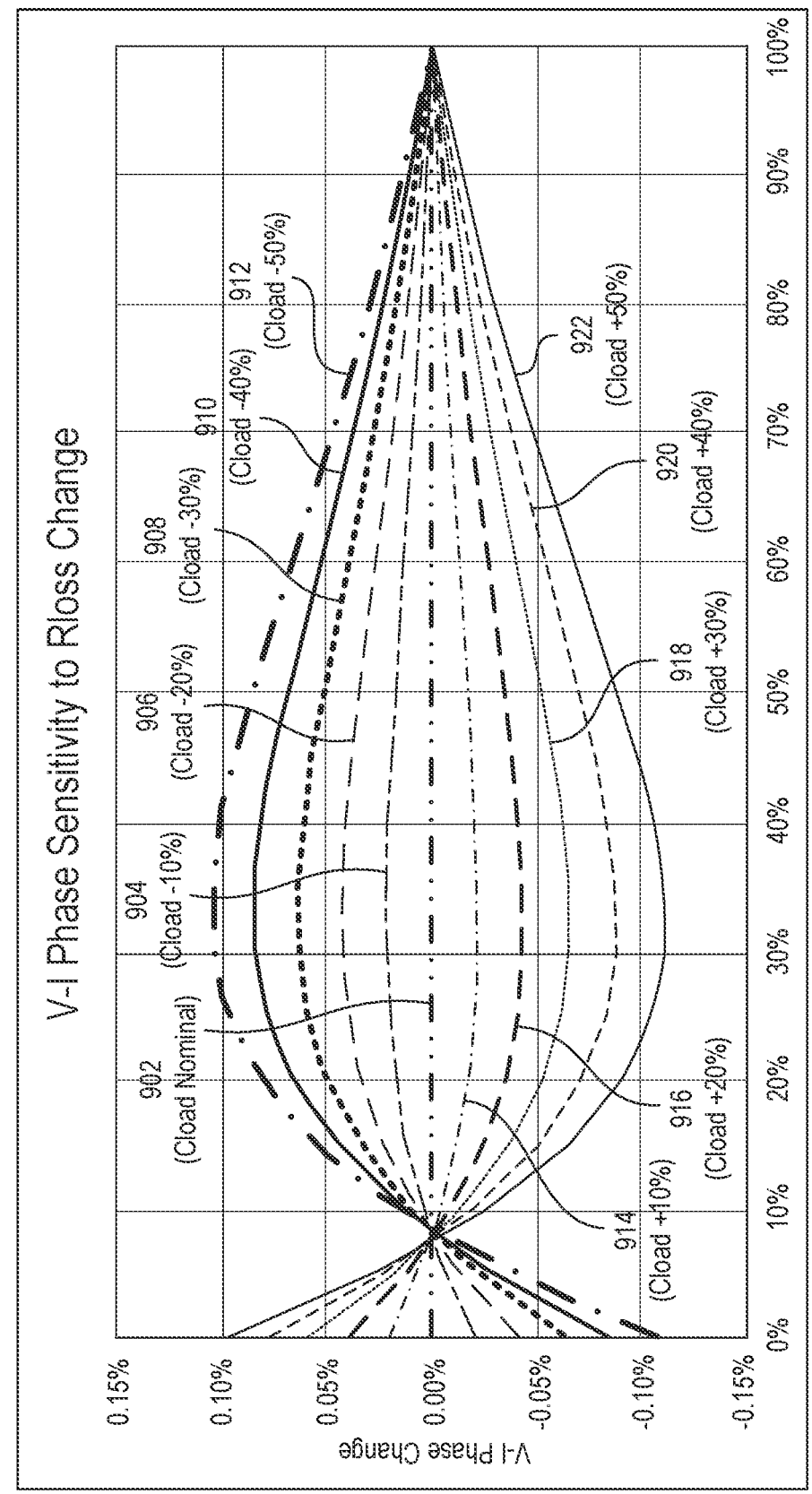
FIG. 9 is a graph that shows the effect on phase-shift of changing the capacitance value of the capacitive element of a pseudo-load attached to the sensing coils of an LVDT/RVDT in accordance with embodiments of the present technology.

FIG. 9 is a graph 900 that shows the effect on phase-shift of changing the capacitance value of the capacitive element of the load (e.g., the capacitive element 228 of the pseudo-load 220 (FIGS. 2-4)) in accordance with embodiments of the present technology. The phase change response is shown verses the displacement of the core 210.

When the capacitive element 228 has its nominal capacitance value (Cload Nominal), the phase change response as the core 210 is displaced is shown by a first line 902. As the capacitance value of the capacitive element 228 is decreased relative to the nominal capacitance value (indicated as Cload −10%, Cload −20%, Cload −30%, Cload −40%, and Cload −50%), the phase change response as the core 210 is displaced is shown with second-sixth lines 904, 906, 908, 910, and 912, respectively. As the capacitance value of the capacitive element 228 is increased relative to the Cload Nominal (indicated as Cload +10%, Cload +20%, Cload +30%, Cload +40%, and Cload +50%), the phase change response as the core 210 is displaced is shown with seventh-eleventh lines 914, 916, 918, 920, and 922, respectively.

As shown by Cload −50% (line 912) and Cload +50% (line 922), a change of 50% in the capacitance value has a maximum effect of about 0.1% on the phase measurement. The insensitivity of the response to relatively large changes in capacitance is relevant, as the pseudo-load 220, 320 co-located with the LVDT 202 and/or RVDT 304 can be the component experiencing the highest value change, given possible extreme environmental conditions the pseudo-load 220, 230 can be exposed to, such as heat changes when located near engines 111 in the rocket system 100 of FIG. 1. In addition, capacitive elements (e.g., capacitors) generally have larger temperature change coefficients than resistors, and the demonstrated level of insensitivity contributes to a more reliable and predictable circuit response.

Figure 10:
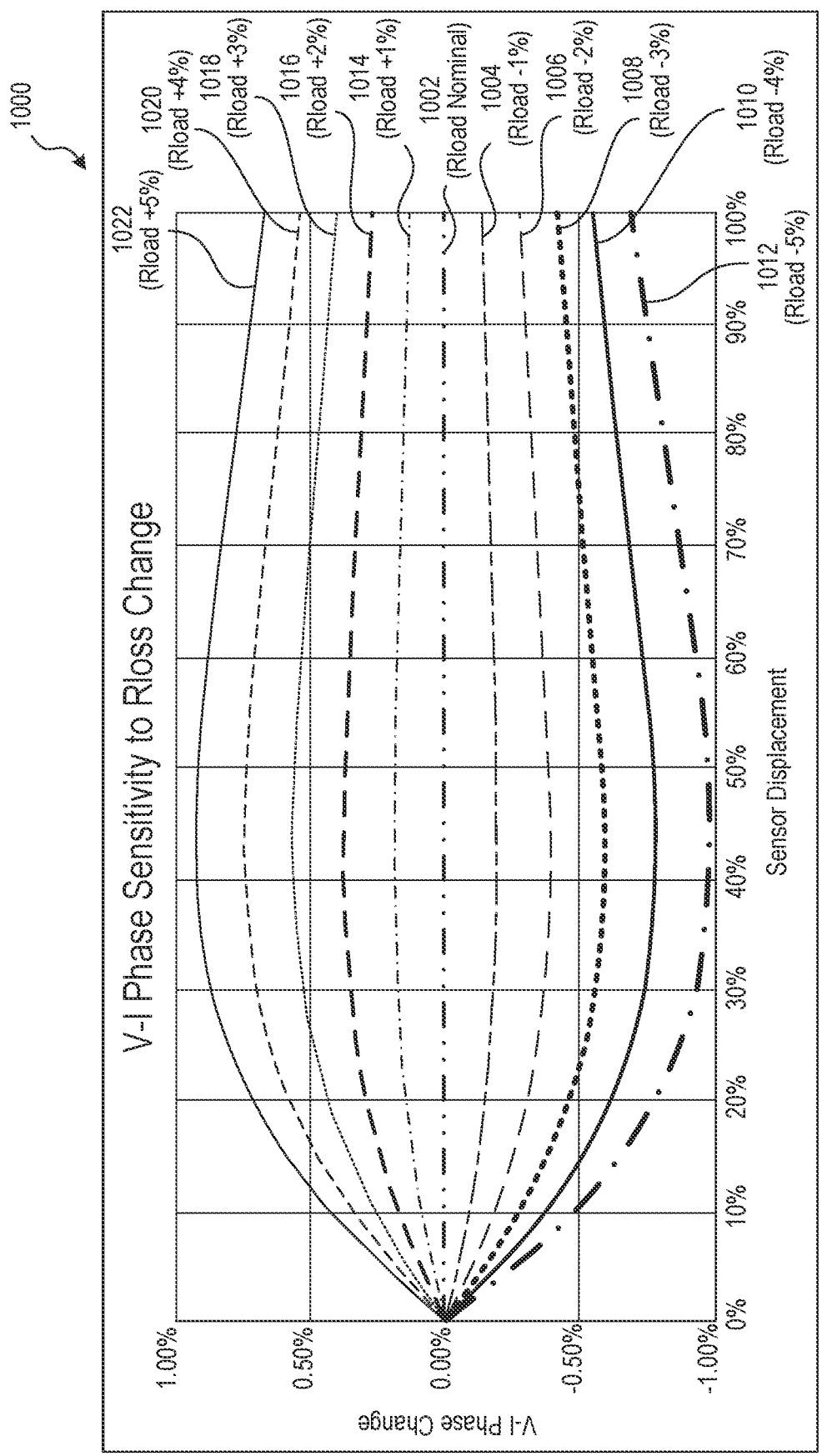
FIG. 10 is a graph that shows the effect on phase-shift of changing the resistance value of the resistive element of a pseudo-load attached to the sensing coils of an LVDT/RVDT in accordance with embodiments of the present technology.

FIG. 10 is a graph 1000 that shows the effect on phase-shift of changing the resistance value of the resistive element of the load (e.g., the resistive element 226 of the pseudo-load 220 (FIGS. 2-4)) in accordance with embodiments of the present technology. Again, the phase change response is shown verses displacement of the core 210.

When the resistive element 226 has its nominal resistance value (Rload Nominal), the phase change response as the core 210 is displaced is shown with a first line 1002. As the resistance value of the resistive element 226 is decreased relative to the nominal value (indicated as Rload −1%, Rload −2%, Rload −3%, Rload −4%, and Rload −5%), the phase change response as the core 210 is displaced is shown with second-sixth lines 1004, 1006, 1008, 1010, and 1012, respectively. As the resistance value of the resistive element 226 is increased relative to the Rload Nominal (line 1002) (indicated as Rload +1%, Rload +2%, Rload +3%, Rload +4%, and Rload +5%), the phase change response as the core 210 is displaced is shown with seventh-eleventh lines 1014, 1016, 1018, 1020, and 1012, respectively. As shown by Rload −5% (line 1012) and Rload +5% (line 1022), changing the resistance value of the resistive element 226 has a maximum effect of less than 1% on the phase measurement.

Figure 11:
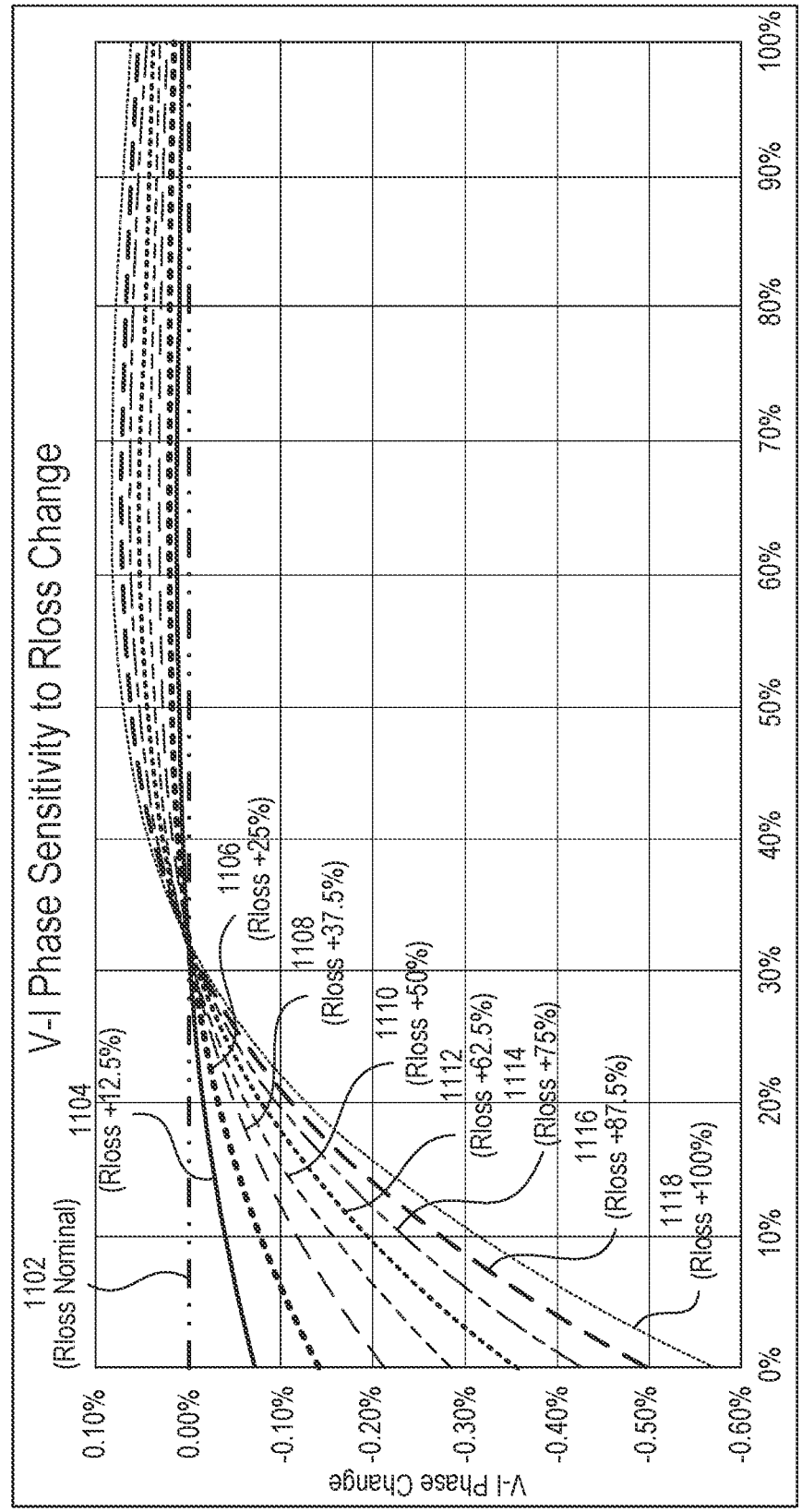
FIG. 11 is a graph that shows the effect on phase-shift as transformer losses of an LVDT/RVDT increase in accordance with embodiments of the present technology.

FIG. 11 is a graph 1100 that shows the effect on phase-shift as transformer losses increase, modeled as a series resistance in the excitation coil 204 (FIGS. 2-4) and the first and second sensing coils 206, 208 in accordance with embodiments of the present technology. When the coils 204, 206, 208 of the LVDT 202 have their nominal resistance loss value (Rloss Nominal), the phase change response as the core 210 is displaced is shown with a first line 1102. As the resistive loss increases relative to the nominal resistance loss value (indicated as Rloss +12.5%, Rloss +25%, Rloss +37.5%, Rloss +50%, Rloss +62.5%, Rloss +75%, Rloss +87.5%, and Rloss +100%), the phase change response as the core 210 is displaced is shown with second-ninth lines 1104, 1106, 1108, 1110, 1112, 1114, 1116, and 1118, respectively. As shown by Rloss +100% (line 1118), an increase of 100% of the transformer loss has a maximum effect of less than 0.6% on the phase measurement.

Figure 12:
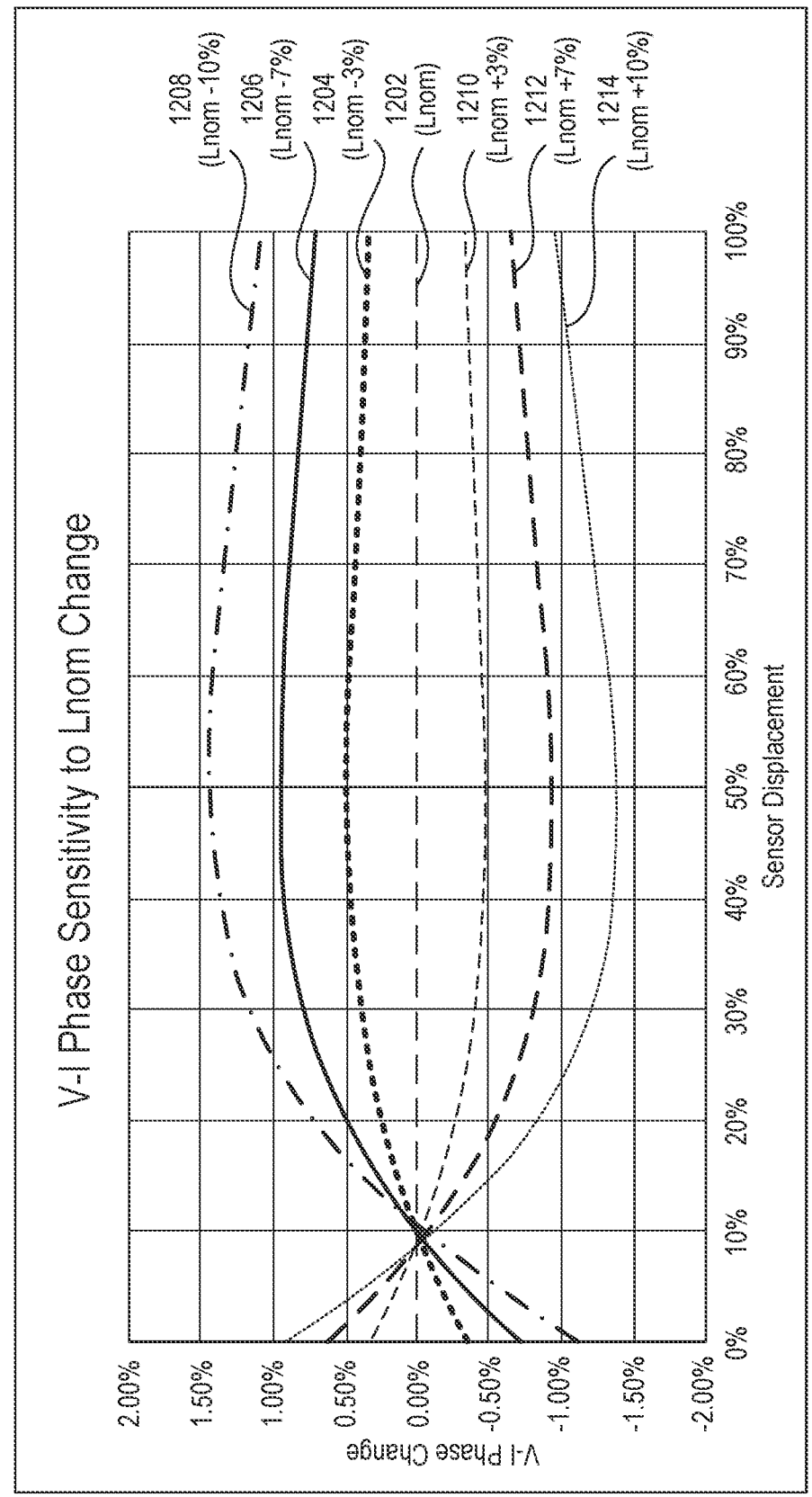
FIG. 12 is a graph that shows the effect on phase-shift of changing the inductance value of an LVDT/RVDT in accordance with embodiments of the present technology.

FIG. 12 is a graph 1200 that shows the effect on phase-shift of changing the inductance value of the excitation coil 204 (FIGS. 2-4) and the first and second sensing coils 206, 208 in accordance with embodiments of the present technology. When the coils 204, 206, 208 of the LVDT 202 have their nominal inductance value (Lnom), the phase change response as the core 210 is displaced is shown with a first line 1202. As the inductance is reduced relative to the nominal inductance value (indicated as Lnom −3%, Lnom −7%, and Lnom −10%), the phase change response as the core 210 is displaced is shown with second-fourth lines 1204, 1206, and 1208, respectively. As the inductance is increased relative to the nominal inductance value (indicated as Lnom +3%, Lnom +7%, and Lnom +10%), the phase change response as the core 210 is displaced is shown with fifth-seventh lines 1210, 1212, and 1214, respectively. As shown by Lnom −10% (line 1208) and Lnom +10% (line 1214), a change of 10% on sensor inductance has a maximum effect of less than 1.5% on the phase measurement.

Figure 13:
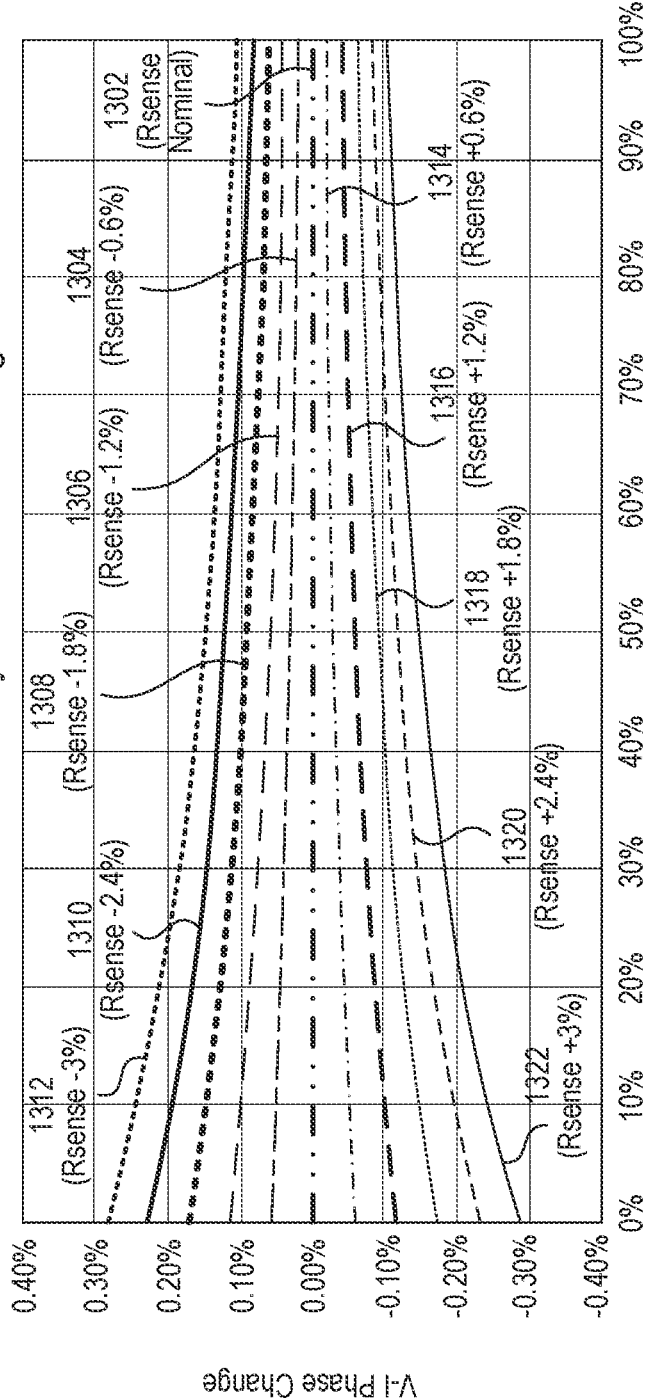
FIG. 13 is a graph that shows the effect on phase-shift of changing the resistance value of the sensing resistor on the phase change in accordance with embodiments of the present technology.

FIG. 13 is a graph 1300 that shows the effect on phase-shift of changing the resistance value of the sensing resistor 236 (FIGS. 2-4) on the phase change in accordance with embodiments of the present technology. When the sensing resistor 236 has its nominal resistance value (Rsense Nominal), the phase change response as the core 210 is displaced is shown with a first line 1302. As the resistance is reduced relative to the nominal resistance value (indicated as Rsense −0.6%, Rsense −1.2%, Rsense −1.8%, Rsense −2.4%, and Rsense −3%), the phase change response as the core 210 is displaced is shown with second-sixth lines 1304, 1306, 1308, 1310, and 1312, respectively. As the resistance is increased relative to the nominal resistance value (indicated as Rsense +0.6%, Rsense +1.2%, Rsense +1.8%, Rsense +2.4%, and Rsense +3%), the phase change response as the core 210 is displaced is shown with seventh-eleventh lines 1314, 1316, 1318, 1320, and 1322, respectively.

As shown by Rsense −3% (line 1312) and Rsense +3% (line 1322), a change of 3% on the sensing resistance value has a maximum effect of less than 0.3% on the phase measurement. The total value of sensing resistance can include the wiring resistance from the sensing resistor 236 to the LVDT 202, which varies with parameters such as length and material used. However, these effects can be nullified via calibration. In some embodiments the resistance of the sensing resistor 236 may not change by a large amount if it is not co-located with the transformer system 200, 300 (FIG. 2-4) and is not exposed to wide environmental conditions.

As discussed herein, advantages of the transformer system 200, 300 (FIGS. 2-4) can include reducing the number of cables needed to connect the device to its sensing circuit 400 (FIG. 4). This can simplify installation, reduce troubleshooting, and reduce the space and weight requirements associated with the device, which is important in rocket system applications. The transformer system 200, 300 can be located remote from the sensing circuit 400 and can be housed in locations that experience extreme heat and/or vibration loads and/or load changes without experiencing a degradation in performance. Also, the sensing circuit 400 can determine the position of a linear or rotary movable device that is attached to the transformer system 200, 300 with a single measurement, rather than an average over time, providing very fast feedback from critical components such as fins and nozzles.

From the foregoing, it will be appreciated that specific embodiments of the disclosed technology have been described herein for purposes of illustration, but that various modifications may be made without deviating from the technology. For example, the linear transformer system and the rotary transformer system can be used in a variety of applications to control any object currently controlled with a standard LVDT/RVDT. The linear and/or rotary transformer system can accomplish this control of an object more quickly than a standard LVDT/RVDT, as it does not require voltage averaging circuits. In some embodiments, the transformer system 200, 300 can be used with the rocket system 100 of FIG. 1 to measure a position of a fuel/oxidizer valve piston, determine an orientation of an engine nozzle 112, and/or determine a position of a hydraulic piston that rotates one of the fins 114. Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the disclosure and associated technology can encompass other embodiments not expressly shown or described herein.

As used herein, the terms "generally" and "approximately" refer to values or characteristics within a range of ±10% from the stated value or characteristic, unless otherwise indicated. Furthermore, the phrase and/or, as in "A and/or B", refers to A alone, B alone, and both A and B.

I claim:

1. A system configured to detect movement of an object, comprising:
    a transformer circuit configured to detect movement of the object, the transformer circuit including:
        an excitation signaling component configured to receive an excitation signal that corresponds to a periodic signal;
        first and second signaling components;
        a core configured to be operatively coupled to the object and movable relative to the first and second signaling components when the object moves;
    first and second loads connected to the first and second signaling components, respectively, the first load having a different phase-shifting characteristic than the second load; and
    a sensing circuit configured to determine a phase-shift between the excitation signal and the periodic signal, the phase-shift being correlated with a position of the core relative to the first and second signaling components.

2. The system of claim 1, further comprising a sensing resistor connected to a signal generator at a first terminal of the sensing resistor and the excitation signaling component at a second terminal of the sensing resistor, the sensing circuit further being configured to detect (1) the periodic signal between the signal generator and the sensing resistor and (2) the excitation signal between the sensing resistor and the excitation signaling component.

3. The system of claim 2, wherein the sensing circuit includes:
    a first comparator configured to receive the excitation signal and the periodic signal; and
    a second comparator configured to receive the periodic signal and to be connected to ground, wherein the sensing circuit is further configured to determine the position of the core based on outputs of the first and second comparators.

4. The system of claim 3, wherein the sensing circuit is further configured to determine the position of the core based on a timing difference between corresponding portions of the outputs of the first and second comparators.

5. The system of claim 1, wherein the first load includes a capacitive element.

6. The system of claim 1, wherein the first load includes a capacitive element and a resistive element.

7. The system of claim 1, wherein the first and second loads have different resistances, different capacitances, or both.

8. The system of claim 1, further comprising first and second cables connecting the sensing circuit with the excitation signaling component, the sensing circuit being located remote from the core and the first and second signaling components.

9. The system of claim 1, wherein the transformer circuit is a linear transformer system.

10. The system of claim 1, wherein the transformer circuit is a rotary transformer system.

11. A transformer circuit configured to identify a position of an object or a change in the position, the transformer circuit comprising:
   an excitation signaling component configured to receive an excitation signal;
   a first signaling component including a first load;
   a second signaling component located away from the first signaling component and including a second load that is configured to cause a different delay in the excitation signal than the first load; and
   a core configured to move between first and second positions respectively corresponding to the first and second signaling components and according to the position of the object, the core configured to inductively couple the excitation interface to the first signaling component, the second signaling component, or a combination thereof according to the position of the object.

12. The transformer circuit of claim 11, wherein the first load includes a capacitive element configured to cause a different phase shift in the excitation signal in comparison to the second load.

13. The transformer circuit of claim 11, wherein the first and second loads are configured to provide different resistances.

14. The transformer circuit of claim 11, wherein:
   the excitation signaling component is opposite the first and second signaling components and across the core; and
   the core is further configured to move linearly relative to the first and second signaling components.

15. The transformer circuit of claim 11, wherein the core is further configured to move rotationally relative to the first and second sensing coils.

16. A method of identifying a position of an object or a change in the position, the method comprising: providing a periodic signal to an excitation signaling component; inductively coupling the excitation to a first load, a second load, or a combination thereof using a core configured to move between first and second positions according to a movement of the object, wherein the first and second positions correspond to the first and second loads; detecting a loaded signal at the excitation signaling component, wherein the loaded signal represents the periodic signal that has been changed according to the inductive coupling between the excitation signaling component and the first and/or second load according to a location of the core; and determining the position of the core based on a timing difference between the periodic signal and loaded signal.

17. The method of claim 16, wherein determining the position of the core includes calculating a phase shift between the periodic signal and the loaded signal.

18. The method of claim 16, wherein calculating the delay includes:
   generating a first comparator output that represents a reference point in the periodic signal;
   generating a second comparator output that represents a corresponding point in the loaded signal; and
   calculating the delay between the first and second comparator outputs.

19. The method of claim 16, wherein:
   the first and second loads provide different capacitances; and
   inductively coupling the excitation signaling component to the first load, the second load, or the combination thereof using the core includes changing a phase of the periodic signal to generate the excitation signal, wherein the phase change reflects an amount of inductively coupled influence from the first load, the second load, or the combination thereof.

20. The method of claim 16, wherein:
   the first and second loads provide different resistances; and
   inductively coupling the excitation signaling component to the first load, the second load, or the combination thereof using the core includes changing an amplitude of the periodic signal to generate the excitation signal, wherein the amplitude change reflects an amount of inductively coupled influence from the first load, the second load, or the combination thereof.

* * * * *